United States Patent Office 2,899,768
Patented Aug. 18, 1959

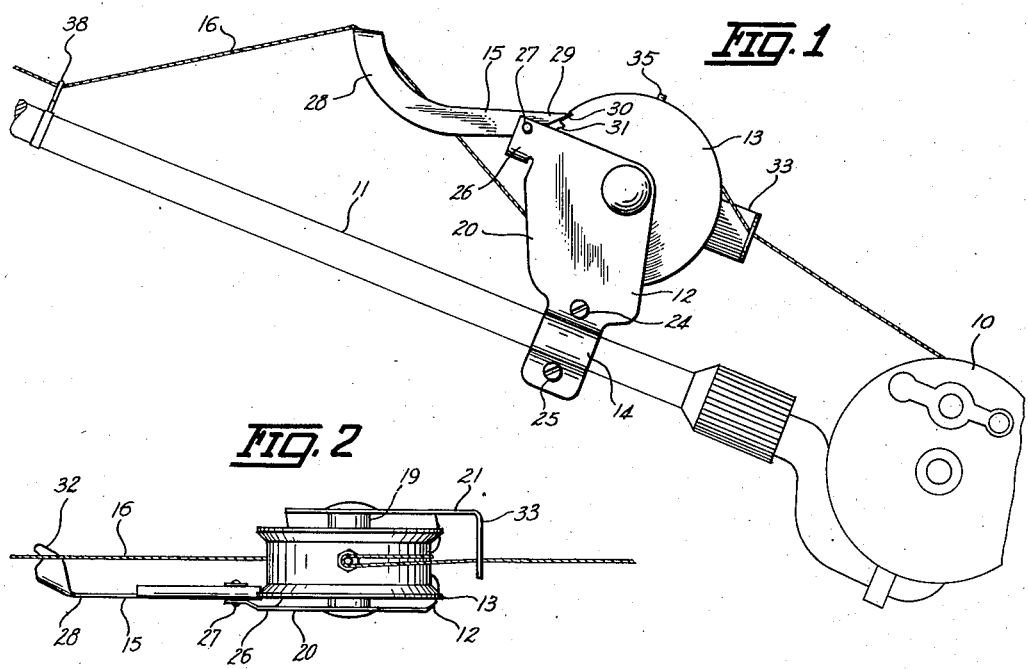
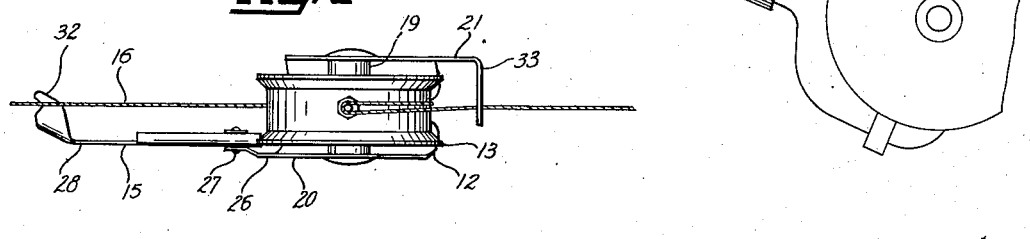
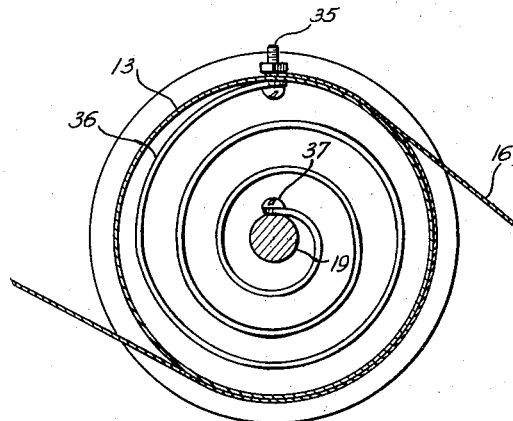
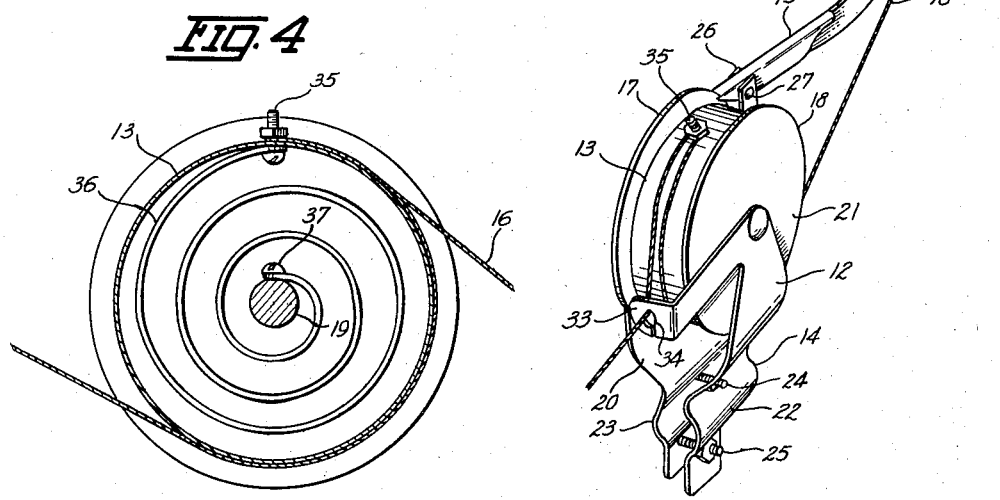
INVENTOR.
JULIUS J. STEINAUER
BY Flournoy Corey
ATTORNEY.

2,899,768

FISHING APPARATUS

Julius J. Steinauer, Lincoln, Nebr.

Application July 24, 1957, Serial No. 673,864

2 Claims. (Cl. 43—15)

This invention relates to a fishing apparatus and more particularly to a device adapted to automatically set the hooks in the mouth of the fish when it bites.

It is a known fact that many instances occur in which fish succeed in removing the bait from the fishing hook without getting caught on the hook itself. This is particularly true if the line and hook are completely inactive at the moment the fish strikes. Many fishermen try to detect this striking action of the fish and then jerk the line at the right moment. This causes the hook to be embedded in the mouth of the fish.

It will be apparent that a device capable of imparting this jerking motion to the line automatically would increase the efficiency of the fishing apparatus substantially. It is therefore a primary object of my invention to provide a device which sets up a jerking motion by trigger action at the instant the fish strikes the hook.

It is yet another object of my invention to provide a device which will operate automatically even though the fishing apparatus is unattended.

It is another object of my invention to provide a device which may be positioned on the pole in series with the standard reel and acting on the fishing line engaged on the reel.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

In said drawings:

Figure 1 is a side view of a device constructed according to my invention mounted on a fishing pole ahead of the reel.

Figure 2 is a top view of the trigger device shown in Figure 1.

Figure 3 is a view in perspective of the device showing the manner in which the fishing line is engaged thereon, and Figure 4 is a view in cross section of the device showing the internal mechanism therein.

Referring now to Figure 1; a device constructed according to my invention is shown mounted on a standard fishing pole 11, just ahead of the conventional reel 10. Generally the device consists of a reel or drum 13 which is rotatably mounted in a saddle 12 which in turn is attached to the pole by a bracket 14. Extending forwardly from the saddle portion is a trigger mechanism 15. The line 16 which normally wraps on the reel 12 is extended about the drum 13 and over the trigger mechanism 15.

Turning now to the device itself and a detailed description thereof; as previously stated, the main operating portion is the cylindrical drum or reel 13. This reel is of substantially the same size as the standard fishing reel. However it is drum-like in construction, having outer flange portions 17 and 18. It is to be understood that this reel is not intended to carry more than three or four turns of line and is not adapted to the storage of any appreciable length of fishing line.

The reel is mounted on a shaft 19 which in turn is positioned in the saddle portion 12. This saddle portion consists of two upright plates 20 and 21. They are angled inwardly on their lower portions and curved as at 22 and 23 to fit around the pole 11. A pair of bolts 24 and 25 extend between the two portions of the saddle on either side of the pole and can be drawn up as tightly as desirable to secure a rigid positioning of the assembly as a whole.

One portion of the saddle member, that is the plate 20, has a forwardly extending portion 26 which extends beyond the periphery of the reel and carries a mounting pin 27 on which is positioned the hook trigger mechanism 28. On the inner end of this trigger mechanism is a pointed portion 29 which is adapted to engage one of two notches 30 and 31 in the flange of the reel proper. On the outer end of the trigger mechanism in a substantially horizontal position is a notched flange 32. It is this flange over which the line 16 is trained. On the opposite side of the reel I provide an angular guide portion 33 having an eye 34 to which the line 16 is also trained.

The drum also carries an outwardly extending pin 35, which is positioned at about 60 degrees in relation to the notches 30 and 31, and in the center of the reel. This pin may be a small machine screw and used not only to hook the line 16, but also to hold the inside coil spring 36 which is shown in Figure 4.

Referring particularly to Figure 4, the coil spring previously mentioned is attached at one end to the pin 35 and at the other end to the shaft 19 by a machine screw 37. This coil spring extends radially around the shaft 19 and is of such a nature as to impart a counter-clockwise motion to the drum 13 when the spring is placed under tension.

In practice, the line 16 is taken from the reel, trained through the eye 34 of the guide bracket, up on the drum and about the pin 35, then back in the opposite direction on the drum underneath the drum, and then outwardly and upwardly through the notch 32 of the trigger mechanism, then back to the eye 38 on the pole 11.

To set the device, the fisherman turns the drum in a counter-clockwise direction three or four times. It will be apparent that in so doing, the line 16 will be wound around the face of the drum. When the tension is sufficient, the trigger mechanism is moved clockwise to a point where the portion 29 engages either the notch 30 or 31. In this connection, it is to be noted that notch 30 is deeper than notch 31 and it will be at once apparent that a greater pull will be required to disengage the trigger mechanism in relation to the reel when the point 29 is placed in the deeper notch 30.

Since the line has been trained over the pin 35, back under the reel, and then over the trigger mechanism 32, it will be apparent that any outward pull on the line will cause the trigger mechanism 28 to be pulled downwardly, thus disengaging the point in relation to either one of the notches. This will release the stored energy in coil spring 36 and the drum will be spun in a counter-clockwise direction. In so doing, since the line is hooked on the pin 35, it will be drawn about the circumference of the reel. The action will be sudden and jerking in nature. The obvious result will be the sudden upwardly movement of the line and a consequent setting of the conventional fish hook which will be normally positioned on the end of the line.

It will be seen from the foregoing that I have provided a simple device which is adapted to automatically reel in the fishing line for a short distance whenever any slight tension equal to the weight of the fish is placed on the line.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a fishing apparatus, a fishing pole, a fish line reel mounted on said fishing pole, a saddle member adapted to be fixedly positioned on said fishing pole ahead of said reel, a second drum-like reel pivotally mounted in said saddle, said drum-like reel having a pin extending radially outwardly from the surface thereof, a spring member fixedly attached at one end to said pivotal mounting, the other end being fixedly attached to the outer periphery of said drum-like reel, a guide member radially distant from said pivotal mounting, a trigger means pivotally positioned on said saddle member opposite said radial guide means, a plurality of notches positioned on said drum-like reel and adapted to engage said trigger means, a fishing line wound on said first reel and adapted to be threaded through said guide means about said drum-like reel and about said radially extending pin thence in reverse about said reel and over said trigger means, whereby movement of said line shall cause said trigger mechanism to disengage said notch, thereby releasing stored energy in said spring to cause the movement of said fishing line.

2. In a device of the type described, a fishing pole, a reel mounted on said pole, a saddle member adapted to be fixedly positioned on said fishing pole outwardly of said first reel, a shaft mounted in said saddle, a second drum-like reel pivotally mounted on said shaft, said drum-like reel having a pin extending radially outwardly from the surface thereof, a guide portion extending outwardly of said saddle to a radial distance beyond said second reel toward said first reel, a trigger mechanism pivotally mounted on said shaft opposite said guide portion, said trigger mechanism including an outwardly extending arm of substantial length having a guide lip on the outer end thereof, said arm being pointed at the inward end thereof and adapted to register in relation to the outer periphery of said reel, a plurality of notches in said reel of varying depth positioned to engage the said pointed arm portion, stored energy means within said reel adapted to move said reel counter-clockwise, a fishing line threaded from said first reel through said first guide means about said second reel and about said radially extending pin, thence in reverse about said reel, thence outwardly over the outer end of said guide portion on said pivotally mounted arm, thence downwardly, said line being adapted to cause the movement of said arm when said line is under tension, whereby the stored energy will be released and said line wrapped in a counter-clockwise direction.

References Cited in the file of this patent

UNITED STATES PATENTS

| | | |
|---|---|---|
| 1,524,011 | Ballew | Jan. 27, 1925 |
| 2,303,668 | Tilbury | Dec. 1, 1942 |
| 2,637,112 | La Fontaine et al. | May 5, 1953 |